3,115,394
PROCESS FOR THE PRODUCTION OF
HYDROGEN
Everett Gorin and Charles H. Rice, both of Pittsburgh,
Pa., assignors to Consolidation Coal Company, Pittsburgh, Pa., a corporation of Pennsylvania
Filed May 29, 1961, Ser. No. 113,322
3 Claims. (Cl. 23—212)

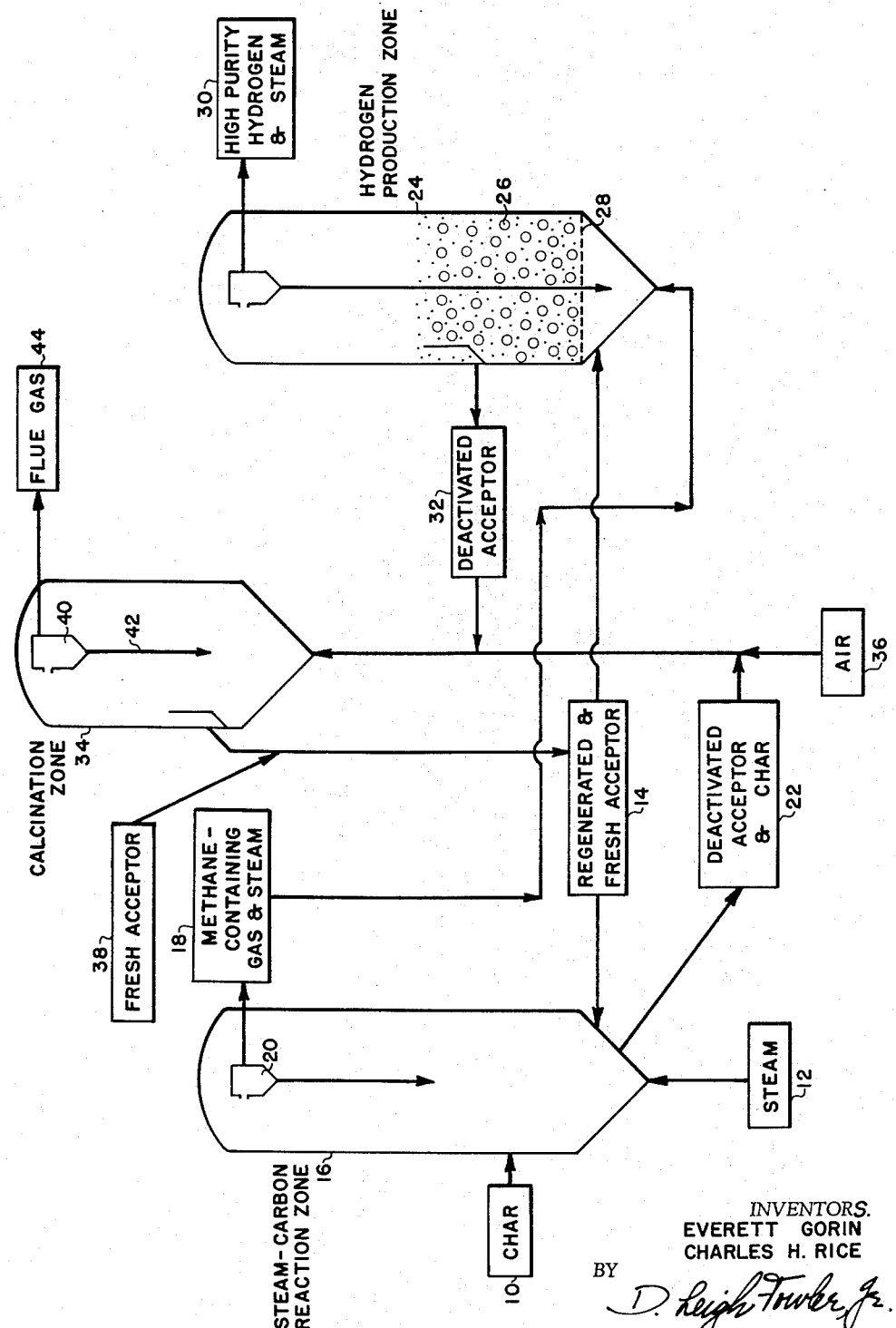

This invention relates to a process for the production of hydrogen. More particularly, this invention relates to a process for the production of high purity hydrogen from hydrocarbonaceous solids.

Hydrogen is generally produced from hydrocarbon-containing gases such as natural gas, coke oven gas, and the like. Hydrocarbonaceous solids have also been used to produce hydrogen; however, the cost of producing hydrogen from a hydrocarbonaceous solid is usually much higher than the cost of producing hydrogen from a hydrocarbon-containing gas. As a result of our recent research, we have now developed a process for producing hydrogen from hydrocarbonaceous solids at a lower cost than the cost of producing hydrogen by any hydrogen production scheme previously used.

The primary object of this invention is to provide a process for producing low cost high purity hydrogen from hydrocarbonaceous solids.

A further object of this invention is to provide a novel economic process for the production of hydrogen.

A still further object of this invention is to provide a process for producing hydrogen from hydrocarbonaceous solids at a lower cost than the cost of producing hydrogen from hydrocarbon-containing gases.

Still another object of this invention is to provide a continuous economic process for the production of high purity hydrogen from hydrocarbonaceous solids.

Briefly, the process of this invention comprises preparing an inexpensive methane-containing gas from hydrocarbonaceous solids and then subjecting the inexpensive gas to a modified steam-reforming reaction zone to produce high purity hydrogen.

In accordance with our invention, the inexpensive methane-containing gas is produced by reacting a hydrocarbonaceous solid with steam in the presence of carbon dioxide acceptor particles in a steam-carbon reaction zone. The steam and the hydrocarbonaceous solid undergo a conventional steam-carbon reaction to yield hydrogen, methane, carbon monoxide, and carbon dioxide by the following reactions:

(Reaction 1) $C+H_2O=CO+H_2$
(Reaction 2) $C+2H_2O=CO_2+2H_2$
(Reaction 3) $C+2H_2=CH_4$
(Reaction 4) $CO+H_2O=CO_2+H_2$ The carbon dioxide immediately reacts with the carbon dioxide acceptor particles and is absorbed thereon, thus causing additional hydrogen to be formed via the reactions 2 and 4. A gaseous mixture of unreacted steam and product gas is recovered in a solids-free state from the steam-carbon reaction zone. The product gas, i.e., the inexpensive methane-containing gas, comprises primarily hydrogen with some methane, carbon monoxide, and carbon dioxide. Carbon dioxide acceptor particles are separately recovered from the steam-carbon reaction zone.

The mixture of methane-containing gas and steam is introduced into a modified steam-reforming reaction zone, hereinafter referred to as a hydrogen production zone. A fixed bed of steam-reforming catalyst (the fixed bed having interstices between the individual catalyst particles) is maintained in the hydrogen production zone. An inventory of carbon dioxide acceptor particles is maintained in the hydrogen production zone in a fluidized bed, at least a portion of the fluidized bed of acceptor particles being maintained within the interstices of the fixed catalyst bed. The mixture of methane-containing gas and steam acts as the fluidizing medium. Methane and any additional hydrocarbon gases present in the methane-containing gas react with steam in the presence of the steam-reforming catalyst to yield carbon monoxide and hydrogen via the following reaction:

(Reaction 5) $CH_4+H_2O \rightarrow CO+3H_2$

Carbon monoxide which is present in the methane-containing gas and the carbon monoxide formed by reaction 5 simultaneously undergo the conventional water gas shift (reaction 4). The carbon dioxide which is formed via the water gas shift and any carbon dioxide present in the methane-containing gas react with the carbon dioxide acceptor particles and are absorbed thereon. Thus, high purity hydrogen in a solids-free state is continuously recovered from the hydrogen production zone.

Carbon dioxide acceptor particles are separately and continuously recovered from the hydrogen production zone substantially free of steam-reforming catalyst. The recovered acceptor particles in admixture with the acceptor particles recovered from the steam-carbon reaction zone are introduced into a calcination zone wherein the acceptor particles are regenerated. Regenerated acceptor particles are subsequently recovered from the regeneration zone, at least a portion of which are thereafter reintroduced into the steam-carbon reaction zone and the hydrogen production zone.

At the present time the partial oxidation process and the steam-reforming process are most frequently used commercially to produce high purity hydrogen. The following Table I is a comparison (on an equivalent cost basis) of the cost of producing high purity hydrogen, i.e., a hydrogen-rich gas having a hydrogen content of at least 90 percent (on a mol basis), via the above commercial processes and the process of this invention.

The feed to the partial oxidation process and the steam-reforming process is natural gas which costs 42 cents per million B.t.u. The feed to the process of this invention is a coal-derived hydrocarbonaceous solid referred to as char, more fully discussed hereinafter. The cost of the char is 16 cents per million B.t.u. The cost of compressing the hydrogen to 3000 p.s.i.a. is included in each of the following cases.

TABLE I

*Hydrogen Production Cost Comparison*

| Cases: | Cost—¢/1000 Standard cu. ft. |
|---|---|
| Partial oxidation process | 40.8 |
| Steam-reforming process | 37.3 |
| The process of this invention | 25.5 |

For a better and more complete understanding of our invention, its objects and advantages, reference should be had to the following description and to the accompanying drawing which is a schematic illustration of a preferred embodiment of this invention.

In the following description of the preferred embodiment of our invention, by way of example only, our new process is applied to the hydrocarbonaceous solid residue obtained by the low temperature distillation or carbonization of hydrocarbonaceous solid fuels such as the high volatile bituminous coal found in the Pittsburgh Seam. This residue, for the purpose of convenience, is referred to as char. It is to be understood, however, that the process of this invention is generally applicable to any hydrocarbonaceous solid which reacts with steam to undergo the conventional steam-carbon reaction. Among such materials are included all ranks of coal, lignite, oil shale, tar sands, and coke from coal or petroleum derived products. In addition, hydrocarbonaceous materials which are solid at room temperature but liquefy upon heating, such as coal extract, residual fuel oil, low temperature tar pitch, and shale oil, may also be used. Highly reactive hydrocarbonaceous solids such as char and lignite are preferred because of the relatively moderate temperature at which the process is operated.

PREFERRED EMBODIMENT

The following with reference to the drawing is a description of the preferred embodiment of this invention. Briefly, the process of this invention comprises (1) subjecting char to a steam-carbon reaction in the presence of carbon dioxide acceptor particles in a steam-carbon reaction zone 16 to produce methane-containing gas; (2) introducing a mixture of methane-containing gas and steam into a hydrogen production zone 24 in the presence of steam-reforming catalyst and carbon dioxide acceptor particles to produce high purity hydrogen via the steam-reforming process; and (3) calcining carbon dioxide acceptor particles used in both the hydrogen production zone 24 and the steam-carbon reaction zone 16, in a calcination zone 34.

The heat for calcination is provided by burning char (the char being withdrawn from the steam-carbon reaction zone in admixture with acceptor particles). Regenerated acceptor particles are recovered from the calcination zone 34, portions of which are introduced into the steam-carbon reaction zone 16 and the hydrogen production zone 24.

STEAM-CARBON REACTION ZONE

Char 10, steam 12, and carbon dioxide acceptor particles 14 are introduced into a steam-carbon reaction zone 16. The steam and char react therein (via reactions 1, 2, 3, and 4) to yield hydrogen, methane, carbon dioxide, and carbon monoxide. The zone 16 is maintained at a temperature within the range of about 1400 to 1800° F., preferably 1550 to 1750° F., and at a pressure within the range of about 5 to 40 atmospheres. Steam and char are introduced into the reaction zone 16 at a steam to char ratio in the range of about 1 to 10 parts by weight of steam to parts by weight of carbon contained in the char. Preferably a ratio of about 2 to 4 is employed, more fully explained hereinafter.

Because of the temperature conditions maintained in the zone 16, the char is also devolatilized thereby yielding additional hydrogen, methane, and carbon. When a hydrocarbonaceous material such as coal extract is used in zone 16, coking of the extract takes place thereby yielding hydrogen, methane, and carbon. The carbon produced via coking normally deposits on the acceptor particles. The deposited carbon that does not react via the steam-carbon reaction is subsequently combusted in the calcination zone to provide the heat for calcination of the acceptor particles. Alternatively, the extract may be coked outside of zone 16 and only the product coke sent to the steam-carbon reaction zone 16.

A mixture 18 of methane-containing gas and unreacted steam is recovered from zone 16 via a conventional cyclone separator 20 wherein entrained solids, if any, are removed. A mixture 22 of deactivated acceptor particles (acceptor particles having carbon dioxide absorbed thereon) and unreacted char is withdrawn from the zone 16 in order to regenerate, i.e., calcine, the acceptor particles.

The steam-carbon reaction zone 16 may be any of the conventional type contacting zones. For example, continuous, semi-continuous, or batch operations may be used. The char and carbon dioxide acceptor particles may be employed in the form of a fixed, gravitating, or fluidized bed. Preferably, the acceptor particles and char are maintained in the form of a fluidized bed in the reaction zone 16, the fluidizing medium being upwardly flowing steam 12 and, in some instances, a portion of the mixture 18, as more fully explained hereinafter. To effect satisfactory fluidization, the particle size of the acceptor solids is in the range of about 8 x 200 mesh Tyler standard screen.

It is preferred that the char have a finer particle size than the acceptor particles such that partial segregation of the char and acceptor particles is effected in the zone 16. A portion of the finer sized char particles will thus be maintained above the fluidized bed of acceptor particles, thereby enabling the maximum amount of carbon to be present in the zone 16 at all times. If the char and acceptor particles were the same size, excessive amounts of char would be removed with the acceptor particles and introduced into the calcination zone.

The upward velocity of the steam is generally within the range of about 0.5 to 3.0 feet per second. For example, if the solids have a size consisting within the range of about 8 x 200 mesh, a fluidizing velocity of about 0.7 to 2.0 feet per second is adequate. Simple experimentation will enable one to ascertain the exact fluidizing velocity which should be used.

The carbon dioxide acceptor may be any of the conventional type carbon dioxide acceptors employed by those skilled in the art. Preferably, the acceptor is an alkaline earth oxide, i.e., an oxide of calcium, barium, or strontium. Because of cheapness and abundance of supply, calcium oxide, better known as lime, is normally employed. Lime-bearing natural materials such as dolomite and synthetic acceptor materials such as lime deposited on $\alpha$-alumina or magnesia may also be used.

A particular relationship exists between conditions of temperature and pressure maintained in the zone 16 and the type and amount of certain carbon dioxide acceptors employed therein. Specifically, it has been discovered that when an alkaline earth oxide is mixed with char in the proper proportions and under certain critical conditions of temperature and pressure, the steam-carbon reaction is thermoneutral; i.e., no heat need be added to the system to maintain the reaction. Moreover, under these same thermoneutral conditions, unexpectedly high percentages of hydrogen can be selectively produced. For example, if lime is used as the acceptor, it has been shown (Gorin Patent No. 2,682,455) that at least 1.2 parts by weight of lime to 1 part by weight of carbon contained in the char must be employed in the reaction zone 16. Furthermore, in order to maintain thermoneutral conditions, a minimum pressure must be maintained in the reaction zone, the pressure being a function of the reaction temperature and is expressed by the empirical relation $$P = 3.40 - 1.89 \times 10^{-2}(t-1430) + 4.48 \times 10^{-4}(t-1430)^2$$

where P is the pressure in atmospheres and $t$ is the reaction temperature in ° F. within the range of 1430 to 1800° F.

The empirical relations and amounts of acceptor to be used when barium oxide or strontium oxide are employed are described in Gorin Patents No. 2,682,456 and No. 2,682,457, respectively.

It is possible to operate the zone 16 at somewhat lower pressures than indicated by the above equation, i.e., under conditions where the process is endothermic. The deficiency of heat may be supplied by increasing the rate of circulation of acceptor particles from the calcination zone to the steam-carbon zone 16.

If lime is employed as the acceptor, it is important to note that the partial pressure of steam within the zone 16 should be maintained below the critical value of 13 atmospheres as discussed in Gorin Patent No. 2,705,672, assigned to the assignee of this invention. If the partial pressure of steam is above about 13 atmospheres, the individual particles of lime and calcium carbonate (the lime is converted to calcium carbonate as it absorbs the carbon dioxide) tend to agglomerate, thereby prohibiting fluidization. In order to maintain the steam partial pressure below about 13 atmospheres and still maintain the total pressure above 13 atmospheres, a portion of the mixture 18 is recycled (not shown) to the zone 16 and steam 12 is introduced into the zone 16 at a partial pressure below about 13 atmospheres. The details concerning the control of the steam partial pressure form no part of this invention but are fully discussed in Gorin Patent No. 2,705,672.

The carbon dioxide acceptor particles serve three primary purposes in the steam-carbon reaction zone 16. Firstly, the particles remove carbon dioxide as it is formed, thus increasing the hydrogen content of the methane-containing gas. Secondly, as mentioned above, the heat which is liberated via the exothermic reaction of the carbon dioxide with the acceptor particles is sufficient to maintain the endothermic steam-carbon reaction. Thirdly, the acceptor particles remove sulfur from the methane-containing gas. Char, as well as the other non-gaseous hydrocarbonaceous materials contemplated for use in the steam-carbon reaction zone 16, contains substantial amounts of sulfur. The sulfur readily reacts with hydrogen under the conditions maintained in the zone 16 to form hydrogen sulfide. Because steam-reforming catalyst is readily poisoned by sulfur, it is highly desirable to remove substantially all of the sulfur contained in the methane-containing gas prior to introducing the gas into the hydrogen production zone. The sulfur is removed via the following reaction (using lime as the acceptor):

(Reaction 6)  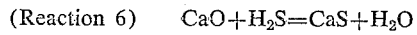 $CaO + H_2S = CaS + H_2O$

HYDROGEN PRODUCTION ZONE

The methane-containing gas obtained from the zone 16 is not of sufficient hydrogen purity for most commercial applications. Methane and the oxides of carbon must be removed to attain the desired hydrogen purity. If methane, as it is formed in the zone 16, reacted with steam via the steam-reforming reaction (reaction 5), the methane content of the product gas would be much lower. Reaction 5, however, does not take place to any significant extent unless an active reforming catalyst is present. Thus, the methane concentration in the methane-containing gas is always greater than would be the case if equilibrium were established in the reaction 5.

A substantial amount of carbon dioxide is also present in the methane-containing gas because of the relatively high temperatures maintained in the steam-carbon reaction zone 16. At these temperatures, i.e., 1550° to 1750° F., the partial pressure of carbon dioxide over the acceptor particles is appreciable.

At least a portion of the mixture 18 of methane-containing gas and steam is introduced into a hydrogen production zone 24 wherein the methane-containing gas is reacted with the steam in the presence of a steam-reforming catalyst and carbon dioxide acceptor particles. Prior to introducing the mixture of steam and methane-containing gas into the zone 24, the mixture is preferably cooled to about 600° to 1200° F. in order to counteract for the exothermic conditions which prevail in the zone 24. If desired, in addition to cooling the mixture 18, the mixture may be treated after cooling with a hydrogen sulfide acceptor to remove last traces of sulfur before contacting the methane-containing gas with the reforming catalyst. Suitable hydrogen sulfide acceptors are manganese oxide and ferrous or copper oxide.

Conventional type steam-reforming catalyst in the form of a fixed bed 26 is maintained in the hydrogen production zone 24 on a grid 28. The steam-reforming catalyst generally comprises particles having a particle diameter in the range of about ¼ to 1 inch, preferably about ¼ to ½ inch. The catalyst may be any of the conventional type steam-reforming catalysts employed by those skilled in the art, e.g., nickel, cobalt, iron or copper. Preferably, the steam-reforming catalyst is a supported catalyst, the support being, for example, alpha alumina or magnesia. If desired, the fixed support may be vertically stacked or dumped Raschig rings. It is to be understood, however, that any type of dump packing which possesses a large free volume may be employed as the fixed support.

The physical arrangement of the individual catalyst particles within the fixed catalyst bed 26 is such that interstices exit between the individual catalyst particles. For ease in understanding the operation of the hydrogen production zone 24, in the drawing the size of the interstices between the catalyst particles is exaggerated.

An inventory of carbon dioxide acceptor particles is also maintained in the hydrogen production zone 24 above the grid 28. The carbon dioxide acceptor particles are maintained in the zone 24 in the fluidized state, at least a portion of the fluidized bed of acceptor particles being maintained within the interstices of the fixed catalyst bed 26.

The operation and conditions maintained in the hydrogen production zone 24 are more fully described in a copending application by W. B. Retallick and E. Gorin, Serial No. 101,777, filed April 10, 1961, and assigned to the assignee of this invention.

The mixture 18 of methane-containing gas and steam is introduced into the hydrogen production zone 24 such that the upward velocity of the mixture is sufficient to maintain the carbon dioxide acceptor particles in the form of a fluidized bed within the zone 24, as previously described. In addition, the fluidized bed of acceptor particles is maintained so that the acceptor particles may be continuously and separately withdrawn from the hydrogen production zone 24.

The hydrogen production zone 24 is maintained under the following conditions: a temperature within the range of about 1200° to 1600° F. and preferably from 1370° to 1520° F.; a pressure within the range of about 5 to 40 atmospheres; an upward gaseous velocity in the range of about 0.5 to 3.0 feet per second; and a steam to methane-containing gas ratio in the range of about 2 to 10 parts by weight of steam to parts by weight of carbon contained in the methane-containing gas. These operating conditions are favorable to both the steam-reforming reaction (reaction 5) and the carbon dioxide acceptor reaction.

In order to maintain the afore-mentioned steam-carbon reaction (reaction 1) at a practical rate, it is necessary to have an excess of steam present in the steam-carbon reaction zone 16. As previously mentioned, the preferred steam to carbon ratio in the zone 16 is in the range of about 2 to 4. This is much greater than the stoichiometric amount of steam required which is a ratio of about 1.5 to 3. Heretofore, the unreacted steam withdrawn from the zone 16 in admixture with the methane-containing gas was of little value. By the process of our invention, however, the unreacted steam is used in the hydrogen production zone 24.

Normally, the amount of unreacted steam contained in the mixture 18 of methane-containing gas and steam is sufficient for the reaction in the hydrogen production zone 24. However, if necessary, additional steam may be introduced therein.

Under the above-mentioned conditions, the steam and the methane contained in the methane-containing gas react in the presence of the steam-reforming catalyst( as previously discussed) to form hydrogen and carbon dioxide. The carbon dioxide that is formed, as well as any carbon dioxide contained in the methane-containing gas, reacts with the carbon dioxide acceptor that is present within the interstices of the fixed catalyst bed, thereby enabling high purity hydrogen to be obtained. The high purity hydrogen, in admixture with unreacted steam, if any, passes into a conventional type cyclone separator wherein entrained solids are removed. A mixture 30 of high purity hydrogen and steam is continuously recovered from the hydrogen production zone 24.

CALCINATION ZONE

As the carbon dioxide acceptor particles absorb carbon dioxide, the individual particles eventually become saturated and thus to be of further use must be regenerated, i.e., the carbon dioxide must be evolved. Carbon dioxide acceptor particles 32 are withdrawn from the hydrogen production zone 24 and conveyed in admixture with the afore-mentioned mixture 22 of unreacted char and carbon dioxide acceptor particles into a calcination zone 34. A carrier gas, for example, air 36, is used to convey the solids into the calcination zone 34.

Preferably, sufficient quantities of air are employed so as to maintain the acceptor particles and char in the form of a fluidized bed within the calcination zone 34.

The calcination zone 34 is maintained at a temperature in the range of about 1700° to 2000° F., at which temperature carbon dioxide is evolved from the acceptor particles. Preferably, the calcination is carried out at about the same pressure as within the hydrogen production zone 24; however, lower pressures may be employed if desired.

In order to supply the heat for calcination, at least a portion of the char is combusted with the air in the presence of the acceptor. Alternatively, the heat for calcination of the acceptor may be supplied by burning an auxiliary fuel in an external combustion chamber and using the sensible heat of the hot flue gases as the heat source. Dual fuel systems may also be used. For example, if a hydrocarbonaceous material such as coal extract is employed in the steam-carbon reaction zone 16, char or any of the other hydrocarbonaceous solid fuels may be used in the calcination zone 34.

Regenerated acceptor particles 14 are withdrawn from the calcination zone 34. A first portion of the regenerated acceptor particles is reintroduced into the steam-carbon reaction zone 16 while a second portion of the regenerated acceptor particles is reintroduced into the hydrogen production zone 24. If desired, fresh acceptor particles 38 may be introduced into the reaction zones with the regenerated acceptor in order to make up for any loss due to attrition.

Flue gas (containing evolved carbon dioxide and any entrained acceptor fines) is introduced into a conventional type cyclone separator 40 wherein substantially all of the fines are removed and reintroduced into the calcination zone 34 via a conduit 42. Flue gas 44 is withdrawn from the calcination zone 34. Economically, it is desirable to use the flue gas to pressurize the carrier gas, i.e., the air 36. For example, the power obtained by expanding the flue gas may be used to operate a compressor to compress the air 36 from the atmospheric pressure to the reaction pressure maintained in the calcination zone 34.

Several specific conditions must be maintained in order to use char in the calcination zone 34. Char contains a large amount of sulfur which, under certain conditions, is highly reactive with calcium (the calcium and sulfur readily form calcium sulfate). In order to reject the sulfur in the char as sulfur dioxide (as a part of the flue gas 44), it is necessary to maintain a slight excess of char in the calcination zone 34 to provide a slight reducing atmosphere, i.e., a small amount of carbon monoxide is always present. Under these conditions, any calcium sulfate formed is reduced and sulfur dioxide is rejected with the flue gas 44. The following reactions 7 and 8 are illustrative of the above sulfur removal:

(Reaction 7)   $CaSO_4 + 4CO = CaS + 4CO_2$
(Reaction 8)   $\frac{1}{4}CaS + \frac{3}{4}CaSO_4 = CaO + SO_2$ A further detrimental feature inherent with the use of char is the high ash content of the char. Obviously, it is undesirable for the ash to build up in the calcination zone 34. Thus, the cyclone separator 40 is adjusted such that ash particles (which are normally much smaller than the acceptor particles) are removed from the calcination zone 34 with the flue gas 44. Fine particles of acceptor which are formed by attrition pass through the cyclone along with the fine ash particles and are discarded from the system.

EXAMPLE

Bituminous coal obtained from the Pittsburgh Seam is subjected to fluidized carbonization at 925° F. whereby char is obtained. The char is further devolatilized by heating to 1470° F. and then introduced into a steam-carbon reaction zone in contact with lime. The devolatilized char feed contains 4 percent volatile matter and 7.2 percent ash. The char and lime are maintained in a fluidized bed in the reaction zone by upwardly flowing steam. The steam, char, and lime react under the following conditions:

Temperature (° F.) _____ 1650
Pressure (atm.) _____ 20
Char feed rate (lb./hr.) _____ 158
Lime feed rate (lb./hr.) _____ 304
Steam feed rate (lb./hr.) _____ 387
Steam velocity (ft./sec.) _____ 0.75

As a result of the steam-carbon reaction and the lime-carbon dioxide reaction, a methane-containing gas in admixture with steam is produced at the rate and having the analysis given below.

| Gas | Mols/Hr. | Mol Percent |
|---|---|---|
| $H_2O$ (Steam) | 10.51 | 45.5 |
| $H_2$ | 8.78 | 37.9 |
| $CH_4$ | 1.40 | 6.1 |
| $CO$ | 1.20 | 5.2 |
| $CO_2$ | 1.10 | 4.7 |
| $H_2S$ | 0.01 | |

The above gas is cooled without condensation of the steam to 650° F. and is subsequently introduced into a hydrogen production zone. No additional steam is added. Steam-reforming catalyst is maintained in the form of a fixed bed within the hydrogen production zone, and carbon dioxide acceptor particles are maintained in a fluidized bed. At least a portion of the fluidized bed is maintained within the interstices of the fixed bed of catalyst. The zone is maintained under the following conditions:

Temperature (° F.) _____ 1470.
Pressure (atm.) _____ 20.2 (absolute).
Carbon dioxide acceptor _____ CaO.
Steam-reforming catalyst _____ Nickel or magnesia.
Space rate (vols gas per vols
  catalyst space per hour) ____ 200
Feed rate of CaO from
  regeneration (lbs./hr.) _____ 29.4

As a result of the steam-reforming and purification reactions, the following hydrogen-rich gas is obtained in the amounts and of the analysis given below.

| Gas | Mols/Hr. | Mol Percent |
|---|---|---|
| $H_2$ | 13.10 | 59.0 |
| $CO_2$ | 0.26 | 1.2 |
| $CO$ | 0.43 | 1.9 |
| $CH_4$ | 0.68 | 3.0 |
| $H_2O$ | 7.62 | 34.3 |

Further purification of the above hydrogen-rich gas for removal of small quantities of $CO_2$ and $CO$ can be effected by cooling the gas to a lower temperature while still in contact with lime. Scrubbing the gas with a mixture of water and the fine lime particles which pass through the cyclone separator 40 will, for example, remove a major portion of the residual carbon dioxide in the gas.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In the process of making hydrogen by the reaction of steam and hydrocarbonaceous solids in the presence of carbon dioxide acceptor particles in a steam-carbon reaction zone whereby a gaseous mixture of unreacted steam and a product gas comprising primarily hydrogen with some methane, carbon monoxide and carbon dioxide is obtained, the improvement which comprises
   (a) conducting at least a portion of said gaseous mixture to a catalytic steam-methane reaction zone containing carbon dioxide acceptor particles, where the methane is converted to carbon monoxide and hydrogen, the carbon monoxide is converted to carbon dioxide and hydrogen, and the carbon dioxide is absorbed by the acceptor particles,
   (b) regulating the steam to carbon ratio in the steam-carbon reaction zone so that substantially all the steam required for the steam-methane reaction zone is supplied by the unreacted steam of the gaseous mixture conducted from the steam-carbon reaction zone, and
   (c) recovering hydrogen-rich gas from the steam-methane reaction zone.

2. The method according to claim 1 in which the temperature of the steam-methane reaction zone is between 1200° and 1600° F. and the pressure is between 5 and 40 atmospheres.

3. The method according to claim 2 in which the carbon dioxide acceptor in both the steam-carbon reaction zone and the steam-methane reaction zone is lime.

References Cited in the file of this patent

UNITED STATES PATENTS

| | | |
|---|---|---|
| 2,649,468 | Benedict et al. | Aug. 18, 1953 |
| 2,682,455 | Gorin | June 29, 1954 |
| 2,705,672 | Gorin | Apr. 5, 1955 |
| 2,781,248 | Gorin | Feb. 12, 1957 |
| 3,004,839 | Tornquist | Oct. 17, 1961 |